United States Patent

[11] 3,568,794

| [72] | Inventor | Jack H. Hilbig |
| | | Chula Vista, Calif. |
| [21] | Appl. No. | 863,083 |
| [22] | Filed | Oct. 2, 1969 |
| [45] | Patented | Mar. 9, 1971 |
| [73] | Assignee | Rohr Corporation |

[54] METHOD AND APPARATUS FOR SUPPRESSING THE NOISE OF A FAN-JET ENGINE
2 Claims, 5 Drawing Figs.

[52] U.S. Cl.................................................. 181/51,
181/56, 239/127.3, 239/265.13, 239/265.17, 239/265.19
[51] Int. Cl.................................................. F01n 1/08, F01n 1/14, B64d 33/06
[50] Field of Search........................................ 181/33, 33.22, 33.221, 33.222, 43, 51, 56, 60; 239/127.3, 265.11, 265.13, 265.17, 265.19

[56] References Cited
UNITED STATES PATENTS

| 2,934,889 | 5/1960 | Poulos.......................... | 181/33(.221) |
| 3,002,341 | 10/1961 | Muzzy et al.................. | 181/33(.221) |
| 3,027,710 | 4/1962 | Maytner....................... | 239/127.3 |

FOREIGN PATENTS

| 885,093 | 12/1961 | Great Britain................ | 181/33(.221) |

*Primary Examiner*—Robert S. Ward, Jr.
*Attorney*—George E. Pearson

ABSTRACT: A tubular housing is concentrically spaced around the aft section of a fan-jet engine casing, and a lobed thrust nozzle is mounted on the aft end of said housing and extends rearwardly from said casing, fan air flowing to the nozzle through the space between said casing and housing and then flowing with exhaust gas of the engine through the lobes of said nozzle. Vanes are mounted at the aft edges of the nozzle lobes for movement between a retracted position extending longitudinally thereof and a deployed position extending laterally from opposite sides thereof.

PATENTED MAR 9 1971 3,568,794

INVENTOR.
JACK H. HILBIG
BY Edwin D. Grant
ATTORNEY 3,568,794

METHOD AND APPARATUS FOR SUPPRESSING THE NOISE OF A FAN-JET ENGINE

SUMMARY OF THE INVENTION

This invention relates to jet-propelled aircraft and more particularly to a method and apparatus for reducing the noise created by aircraft having engines of the fan-jet type.

Parts of the noise associated with the operation of jet-propelled aircraft results from the flow through the atmosphere of the high-velocity exhaust gas discharged from the engine, or engines, of such aircraft. The amount of sound energy so generated by streams of exhaust gas depends upon the temperature and velocity thereof. The present invention provides for the rapid mixing of the high-temperature, high-velocity exhaust gas stream of a fan-jet engine with the relatively lower velocity, low-temperature fan air of said engine, as well as with slipstream air flowing past a housing which encloses the engine. Thus the temperature and velocity of the mixed stream of exhaust gas and air are less then the temperature and velocity of the exhaust gas when the latter is discharged to the atmosphere in conventional manner (i.e., as a stream which remains unmixed with air for a considerable distance downstream from the aft end of the propulsion unit), which reduces the noise of operation of an aircraft having a fan-jet engine. More particularly, in a preferred form of this invention a tubular housing is disposed in concentric, spaced relation around the turbine casing of a fan-jet engine, the aft ends of said housing and said casing being substantially coterminous. A corrugated, or lobed, thrust nozzle is coaxially mounted on the aft end of the housing and extends rearwardly therefrom The corrugations which form the lobes of the nozzle extend axially of the latter and gradually increase in depth in the downstream direction so that the forward edge of the nozzle is circular to match the aft edge of the housing and the aft edge thereof is convoluted. Vanes are pivotally mounted in pairs on the radially extending portions of the aft edge of the nozzle, and means are provided to move these vanes between a retracted position wherein the associated pairs of vanes are side by side and extend downstream from the nozzle aft edge, and a deployed position wherein said associated pairs extend laterally from opposite sides of the radial portions of said nozzle aft edge. A tear-shaped plug is preferably centrally positioned in the aft end of the nozzle and attached at its periphery to the inner portions of the nozzle lobes, and a conical plug is also preferably mounted on the aft bearing housing of the fan-jet engine. The space between the aft section of the engine casing and the housing disposed thereabout communicates with the fan section of said engine, through ducts, and thus both fan air and exhaust gas of the engine flow into the forward end of the nozzle and then through the passages bounded by the inner surface of the nozzle lobes and the periphery of the tear-shaped plug. Hence a mixture of exhaust gas and fan air is discharged to the surrounding atmosphere in streams spaced apart circumferentially of the aft end of the nozzle, and a portion of the slipstream around the housing flows between the lobes of sa nozzle and thence between the streams of exhaust gas combined with fan air. This mixing of both fan air and slipstream (or ambient) air with exhaust gas of the engine produces sound suppression when the vanes are in their retracted position. However, to achieve maximum sound suppression the vanes are moved to their deployed position wherein associated pairs thereof extend laterally from opposite sides of the radial portions of the convoluted aft edge of the nozzle. at which time both the streams of exhaust gas combined with fan air and the streams of slipstream air impinge upon the respective vanes and turbulence is caused in the flow of said streams at the interfaces thereof downstream from the nozzle. This turbulence increases the rate of mixing of air with the hot, high velocity exhaust gas and further reduces the noise level of the exhaust stream of the propulsion assembly.

DETAILED DESCRIPTION

Figure 2:
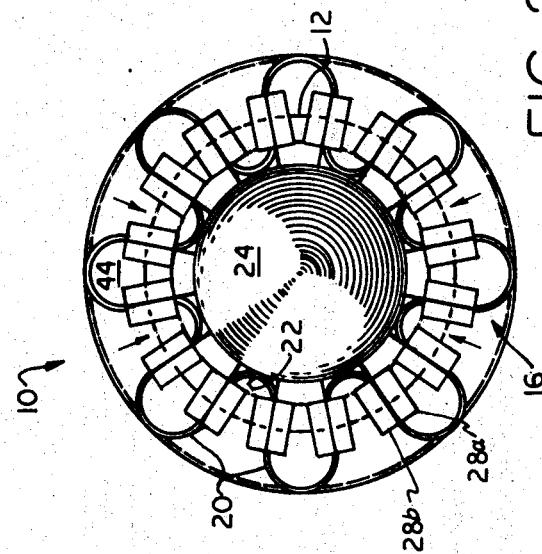
FIG. 2 is a rear view of the same embodiment.
Figure 1:
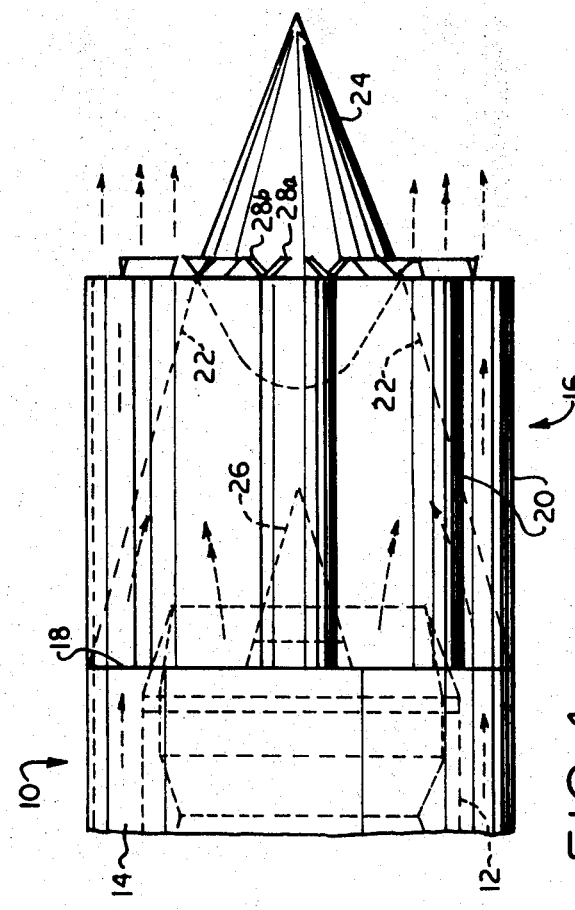
FIG. 1 is a side elevation of a preferred embodiment of the disclosed invention, the drawing illustrating in solid lines the rear portion of a housing which envelops a fan-jet engine, a thrust nozzle attached to the aft end of said engine, vanes pivoted to the aft edge of said nozzle, and a plug mounted in the aft end of said nozzle, and the drawing illustrating in broken lines components which are disposed within said housing and nozzle.

As illustrated in FIGS. 1 and 2, a preferred embodiment of the present invention comprises a tubular housing, or nacelle, which is generally designated by the number 10 and which is disposed in concentric, spaced relation around the turbine casing 12 of a fan-jet engine. The space 14 between housing 10 and casing 12 is connected with the fan section of the engine by means of ducts (not shown) so that it serves as a passage for the flow of fan air (represented by single-headed arrows in the drawing) to a thrust nozzle, generally designated 16, which is fixedly secured to the aft edge 18 of said housing. At its forward end nozzle 16 is circular in cross section so that it matches the aft end of the housing, but the wall of the nozzle is formed with a plurality of longitudinally extending, circumferentially spaced corrugations which begin at a point near the forward end of the nozzle and extend to the aft end thereof, thus forming a plurality of longitudianally extending, radially projecting lobes 20 on said nozzle. The valleys between the lobes gradually increase in depth in the downstream direction, and the innermost portions 22 of the nozzle wall converge toward and are fixedly secured to a hollow, tear-shaped plug 24 which is coaxial with the nozzle. In the illustrated embodiment the crests of lobes 20 are the same distance from the longitudinal axis of the nozzle along the entire length of said nozzle. However, in other embodiments of the invention the crests of the lobes may either diverge from, or converge toward, the longitudinal axis of the nozzle. The illustrated embodiment also comprises a conical plug 26 the base of which is mounted on the aft bearing housing of the engine and which may be omitted in some forms of the invention (as is also the case with respect to plug 24).

Figure 3:
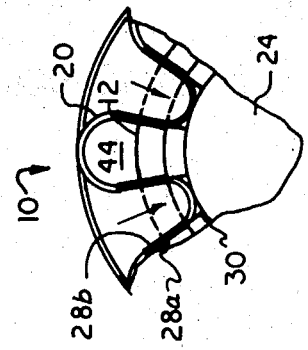
FIG. 3 is another rear view of the same embodiment, illustrating the aforesaid vanes in a position different from their position in FIGS. 1 and 2.
Figure 5:
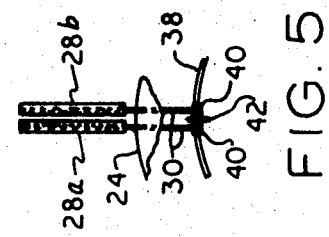
FIG. 5 is a fragmentary cross section of the plug at the aft end of the nozzle, illustrating the same parts of the actuating mechanism.
Figure 4:
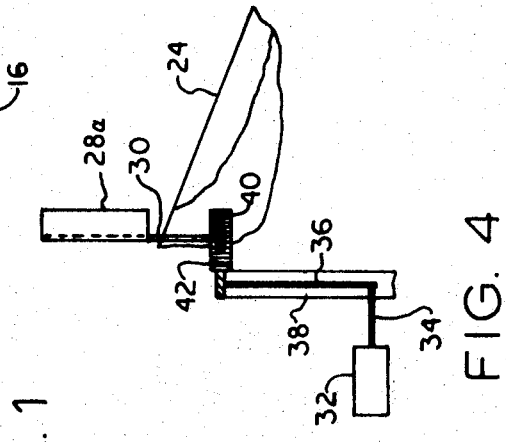
FIG. 4 is a fragmentary longitudinal section of the plug at the aft end of the nozzle, together with typical parts of an actuating mechanism which moves the vanes between the two positions illustrated in FIGS. 1 and 2 and FIG. 3, respectively.

As can be seen in FIG. 2, each lobe 20 of nozzle 16 comprises a pair of sidewalls which extend radially from the innermost curved portions 22 of the nozzle wall. A pair of rectangular vanes 28a, 28b are pivotally mounted at the aft edge of the radially projecting sidewalls of the nozzle lobes, with the axis of rotation of each vane being parallel with said aft edges so that the associated pair of vanes can be rotated between the retracted position illustrated in FIGS. 3—5, wherein the vanes are in side-by-side relation and extend downstream from the aft edge of the nozzle, and the deployed position illustrated in FIGS. 1 and 2, wherein the vanes extend laterally from the sidewalls of the nozzle lobes. More particularly, each vane is mounted on a rod 30 which in turn is journaled in an aperture in the wall of plug 24. Fixedly mounted within plug 24 is an actuator 32 which can be operated to move the drive shaft 34 thereof in opposite directions axially of said plug. A plurality of struts 36 (only one of which is illustrated, in FIG. 4) are fixedly connected at one end to the free end of drive shaft 34 and at the other end to a ring 38 which is coaxially disposed within plug 24. Each rod 30 projects into the interior of plug 24 and has a pinion gear 40 mounted on its inner end, and the gears associated with the respective pairs of vanes 28a, 28b mounted on the same walls of the nozzle lobes mesh with opposite sides of one of a plurality of gear racks 42 which are mounted in circumferentially spaced relation on ring 38 and which project rearwardly therefrom.

OPERATION

As illustrated by double-headed arrows in FIGS. 1, exhaust gas of the fan-jet engine within housing 10 is discharged into the forward, cylindrical end of nozzle 16. Fan air flowing through the space between housing 10 and casing 12 is thus mixed with exhaust gas inside the nozzle, and streams of the mixed fan air and exhaust gas flow through the passages 44 (see FIGS. 2 and 5) bounded by the inner surfaces of the nozzle lobes 20 and the periphery of plug 24. Slipstream air flows into the spaces between lobes 20 and thence between the fan air-exhaust gas streams issuing from said lobes, as indicated by the solid line arrows in FIGS. 2 and 5. When vanes 28a, 28b are in their retracted positions (FIGS. 3—5) the described apparatus reduces the noise of operation of the aircraft of which housing 10 is a part, since the high-temperature, high-velocity exhaust gas is mixed with cool, relatively lower velocity fan air and slipstream or ambient, air. However, to achieve maximum sound suppression actuator 32 is operated to move drive shaft 34 and ring 38 attached thereto rearwardly, which causes gear racks 47 to rotate pinion gears 40 in such manner that the pairs of vanes 28a, 28b are simultaneously swung to their deployed position (FIGS. 1 and 2). Thereafter the ambient air flowing between lobes 20 and the streams of intermixed fan air and gas flowing therethrough impinge upon the vanes, which produces turbulence in the flow of the ambient air streams and the fan air-exhaust gas streams at the interfaces thereof downstream from nozzle 16. This flow turbulence increases the rate of mixing of air with the exhaust gas and thus further reduces the noise generated by flow of the engine exhaust plume through the atmosphere.

It will be obvious that different mechanisms can be used to move vanes 28a, 28b between their retracted and deployed position. Furthermore, various other modifications can be made in the illustrated apparatus without departing from the basic principles of its operation, for example, plugs 24 and 26 may be omitted in some embodiments of the invention, as has been noted hereinbefore. Hence the scope of the invention should be considered to be limited only by the terms of the claims appended hereto.

I claim:

1. In a jet propulsion plant having a fan-jet engine, the combination comprising:
    a tubular housing disposed in spaced relation around the aft section of the casing of said engine, fan air of said engine flowing through the space between said housing and said casing;
    a thrust nozzle fixedly attached to the aft end of said housing and extending rearwardly from said casing, said nozzle being formed with corrugations which extend longitudinally thereof and gradually increase in depth in the downstream direction so as to form on said nozzle a plurality of lobes having radially extending sidewalls.
    a plurality of vanes pivotally mounted in pairs on said sidewalls at the aft end thereof, said vanes being movable between a retracted position wherein they extend longitudinally of said sidewalls and a deployed position wherein they extend laterally from opposite sides of said sidewalls and respectively intercept ambient air flowing through the spaces between said lobes and exhaust gas and fan air flowing through said lobes; and
    means operatively associated with said jet propulsion plant for synchronously moving said vanes between said retracted and deployed positions thereof.

2. The combination defined in claim 1 including a plug centrally positioned the aft end of said nozzle and secured at its periphery to the inner portions of said lobes.